United States Patent [19]
Cox, Jr.

[11] Patent Number: 4,906,359
[45] Date of Patent: Mar. 6, 1990

[54] SOLAR ACTIVATED WATER AERATION STATION

[76] Inventor: Berthold V. Cox, Jr., 1350 Ticonderoga, St. Charles, Mo. 63303

[21] Appl. No.: 338,319

[22] Filed: Apr. 17, 1989

[51] Int. Cl.$^4$ .............................................. B01D 35/00
[52] U.S. Cl. ................................. 210/170; 210/242.2; 261/30; 261/120
[58] Field of Search ............... 210/242.2, 170, 169; 261/30, 120; 119/1, 3

[56] References Cited

U.S. PATENT DOCUMENTS

| | | | |
|---|---|---|---|
| 3,012,631 | 12/1961 | Kaser | 55/497 |
| 3,320,928 | 5/1967 | Smith | 119/3 |
| 3,521,864 | 7/1970 | Welles, Jr. | 210/220 |
| 3,572,658 | 3/1971 | Ravitts | 210/197 |
| 3,626,901 | 12/1971 | Englesson | 119/3 |
| 3,653,641 | 4/1972 | Eron | 210/242.2 |
| 3,794,303 | 2/1974 | Hirshon | 261/120 |
| 3,956,432 | 5/1976 | Hilling | 261/120 |
| 4,172,766 | 10/1979 | Laing et al. | 202/185.2 |
| 4,215,082 | 7/1980 | Danel | 210/242.2 |
| 4,258,661 | 3/1981 | Margen | 119/3 |
| 4,268,398 | 5/1981 | Shuck et al. | 210/242.2 |
| 4,308,137 | 12/1981 | Freeman | 210/242.2 |
| 4,345,587 | 8/1982 | Carvalho | 126/450 |
| 4,409,107 | 10/1983 | Busch | 210/242.2 |
| 4,657,675 | 4/1987 | Zan | 210/170 |
| 4,706,010 | 11/1987 | Callen et al. | 323/906 |
| 4,734,235 | 3/1988 | Holyoak | 210/242.2 |
| 4,812,737 | 3/1989 | Fleck | 323/271 |

Primary Examiner—Richard V. Fisher
Assistant Examiner—Cynthia L. Nessler
Attorney, Agent, or Firm—Polster, Polster and Lucchesi

[57] ABSTRACT

A solar activated water aeration station for introducing oxygen at a predetermined depth into a body of water is disclosed. The station includes a floatable base having a solar panel capable of being adjusted through a range of inclined positions, an anchor connected to the floatable base for orienting and maintaining the floatable base in a pre-selected position with the solar panel having a southern exposure, control means mounted on the floatable base including a motor and air pump operated by the solar panel so as to provide a continuous stream of oxygen through an aeration tube connected to the motor and air pump, in order to deliver the continuous stream of oxygen to a body of water at the desired predetermined depth.

30 Claims, 4 Drawing Sheets

SOLAR ACTIVATED WATER AERATION STATION

BACKGROUND OF THE INVENTION

The present invention relates to a solar activated aeration system for introducing oxygen at a predetermined depth into a body of water.

In order to sustain marine life in lakes, ponds and other bodies of water, a sufficient quantity of oxygen in the water is essential. Generally, oxygen enters water primarily from the atmosphere through a combination of diffusion and turbulent mixing. The oxygen, occurring as dissolved $O_2$ is; however, only moderately soluble in water, and its solubility decreases as temperature increases. This causes serious depletion of oxygen in water during hot summer months.

It will be apparent that an increase in organic matter production by algae and plants in a body of water causes greater demand on dissolved oxygen in the water as the organic matter decomposes at the termination of life cycles. Because of this, the deeper waters in a body of water may become entirely depleted of oxygen, thereby destroying fish habitat and possibly leading to the elimination of desirable species.

Serious oxygen deficiencies are most likely to occur when there is a combination of high temperature and little wind, along with decaying organic materials. There is also the possibility that summer storms with high winds may cause a pond to "turn over" -- mixing oxygen-deficient water from the bottom of the body of water with the surface water, thus further depleting the oxygen supply. During winter, ice and snow covering the body of water may also cause the oxygen levels to be low.

Substantial quantities of dissolved oxygen in water are very important in fish farming. Low oxygen is the number one problem of fish farmers since fish do not feed well at low oxygen concentration and the low oxygen content restricts the carrying capacity of the fish production ponds. Dissolved oxygen concentration of 5 ppm or higher are most desirable for catfish production, but successful fish operations are possible by maintaining oxygen concentrations of at least 4 ppm. Fish may survive oxygen concentrations as low as 0.5 ppm for short periods, but prolonged exposure to such low oxygen levels will result in fish kills or poor growth.

Oxygen depletion in a body of water can be restored by injecting dissolved oxygen at predetermined depths. This principle is well established by U.S. Pat. Nos. 3,956,432; 3,794,303 and 3,320,928, each of which teach the broad concept of utilizing a floatable base connected to an electric motor to pump air through a flexible plastic tube or other elongated tube anchored to the bottom of a pond or lake so as to pump dissolved oxygen into the lake in order to preserve fish, plant life, etc. In U.S. Pat. Nos. 3,626,901; 4,258,661 and 4,657,675, various techniques are employed for replenishing the amount of dissolved oxygen at a predetermined depth in a body of water, the latter two patents also teaching the use of a solar collector adapted to heat water in combination with a heat exchanger or the use of a solar electric energy powered motor which operates an air pump to introduce fresh air into a vertical column to replenish the dissolved oxygen in a body of water.

The prior art has also disclosed the use of a floatable base in conjunction with a water aeration system such as U.S. Pat. No. 3,626,901 which directs dissolved oxygen to a predetermined level in a body of water, while U.S. Pat. Nos. 3,521,864; 3,572,658 and 3,653,641 teach the use of a floatable base with an impeller to draw air and/or water from a body of water and disperse same at a predetermined distance from the floatable base along the surface of the water. Other water aeration devices, some of which disclose a floatable base are shown in U.S. Pat. Nos. 4,193,951; 4,268,398; 4,409,107; 4,215,082 and 4,308,137.

While it is apparent that the prior art is replete with various types of water aeration devices, most of the systems require extensive energy use and continued maintenance. Most of the prior art designs are also cumbersome and inefficient, requiring substantial investments without the possibility of delivering substantial quantities of vital dissolved oxygen at predetermined depths in a body of water.

SUMMARY OF THE INVENTION

Accordingly, among the several objects and advantages of the present invention include:

The provision of a new and improved solar activated water aeration station which overcomes the aforenoted deficiencies of the prior art;

The provision of a new and improved solar activated water aeration system for introducing dissolved and diffused oxygen at a predetermined depth into a body of water;

The provision of the aforementioned solar activated water aeration station which provides anchoring of an associated floatable base in a pre-selected position to enable an associated solar panel to be maintained with a southern exposure, while the solar panel itself is capable of being adjusted through a range of inclined positions, to maximize sun exposure;

The provision of the aforementioned solar activated water aeration station which includes control means operated by the solar panel for energizing a motor and air pump to provide a continuous stream of oxygen to an aeration tube that extends to a predetermined depth in a body of water for delivering the continuous stream of oxygen at the desired predetermined depth;

The provision of the aforementioned solar activated water aeration station wherein the floatable base has a predetermined square foot area sufficient to provide a shaded area within the body of water from the floatable base and the lower end of the aeration tube being anchored at a predetermined depth in the vicinity of the shaded area, in order to provide a fish comfort station including both shade and dissolved oxygen.

The provision of the aforementioned solar activated water aeration station wherein the control means includes a linear control booster connected between the solar panel and the motor and air pump for controlling and boosting the output from the solar panel, in cooperation with a motor and air pump of the oil-less continuous operating type, in order to maximize power output and operation efficiency;

The provision of the aforementioned solar activated water aeration station including an externally mounted air filter which is releasably connected to a self-contained enclosure containing the control means, and also having venting means for exhausting heated air and any accumulated moisture from the enclosure to atmosphere; and The provision of the aforementioned solar activated water aeration station which is light weight, durable and long lasting; is safe and easy to operate; does not require high operating skills; is extremely efficient and economical to operate requiring no outside energy source and utilizes maintenance free design characteristics; is portable for ready movement to a desired location, but is capable of being maintained in a fixed position at the desired location; delivers and diffuses vital dissolved oxygen to desired predetermined depths; is substantially maintenance free including having an all weather self-cleaning solar panel; and employs numerous other features and advantages to fulfill all of the intended purposes of this invention.

Briefly stated, the solar activated water aeration system of the present invention introduces dissolved oxygen at a predetermined depth into a body of water and includes a floatable base for floating on a body of water, and inclined solar panel operatively mounted on the base to enable the solar panel to be adjusted through a range of inclined positions relative to the floatable base, an anchor which is connected to the floatable base for orienting and maintaining the floatable base in a preselected position with the solar panel having a southern exposure, control means mounted on the floatable base and operated by the solar panel for energizing a motor and air pump to provide a continuous stream of oxygen during activation of the solar panel, and an aeration tube connected to the motor and air pump and extending from the floatable base to a predetermined depth in the body of water for delivering the continuous stream of oxygen to the body of water at the desired predetermined depth.

The floatable base is constructed from water resistant foam material supported within a water resistant wood frame. The wood frame includes spaced horizontal struts extending along top and bottom surfaces thereof and spaced vertical struts extending along sides of the floatable base which are interconnected to the horizontal struts.

The floatable base has a predetermined square area sufficient to provide a shaded area within the body of water from the floatable base and with the lower free end of the aeration tube being anchored at a predetermined depth in the body of water in the vicinity of the shaded area, in order to provide a fish comfort station including both shade and oxygen.

The inclined solar panel is mounted on the upper horizontal struts of the wood frame and includes vertical leg supports connected to the spaced upper horizontal struts of the wood frame, each of the vertical leg supports at an upper end thereof being pivotally adjustably mounted to the solar panel.

The anchor extending from the floatable base is connected to cables depending from opposite sides thereof, the cables being shortened or lengthened relative to the floatable base in order to provide the desired depth position of the anchor. The anchor is of one-piece concrete construction with a rectangular configuration and having eye bolt secured therein for attachment to the cables.

The control means of the solar activated water aeration system, including the motor and air pump, is mounted within a self-contained enclosure also mounted on the floatable base. The control means further includes a linear control booster which is connected between the solar panel and the motor and air pump for controlling and boosting the output from the solar panel. The motor and air pump are of the oil-less continuous operating type constructed of corrosion resistant material. The motor and air pump are a combined D.C. motor and air pump.

The air pump draws outside air through an outside air line connected to an air filter externally mounted on the enclosure. The air filter is releasably connected to a hollow element extending through the enclosure, the outside air line being connected to the hollow element within the enclosure. The air filter includes an overhanging protective shroud and air passageways which extend from the bottom of the filter upwardly into the filter, and then downwardly through the hollow element in the enclosure.

The enclosure further includes a chimney extending from the enclosure for exhausting heated air from within the enclosure to atmosphere. The enclosure is also provided with a back pressure p.s.i. oxygen gauge to determine the operation of the diffuser, and a volt meter to determine the amount of voltage generated by the solar panel.

The aeration tube includes diffuser means cooperating with the lower free end thereof for breaking up the flowing dissolved oxygen into smaller molecules in order to facilitate mixing of the dissolved oxygen into the body of water at the desired predetermined depth.

These and other objects and advantages of the present invention will become more apparent from the description that is to follow.

DESCRIPTION OF THE PREFERRED EMBODIMENTS

Figure 1:
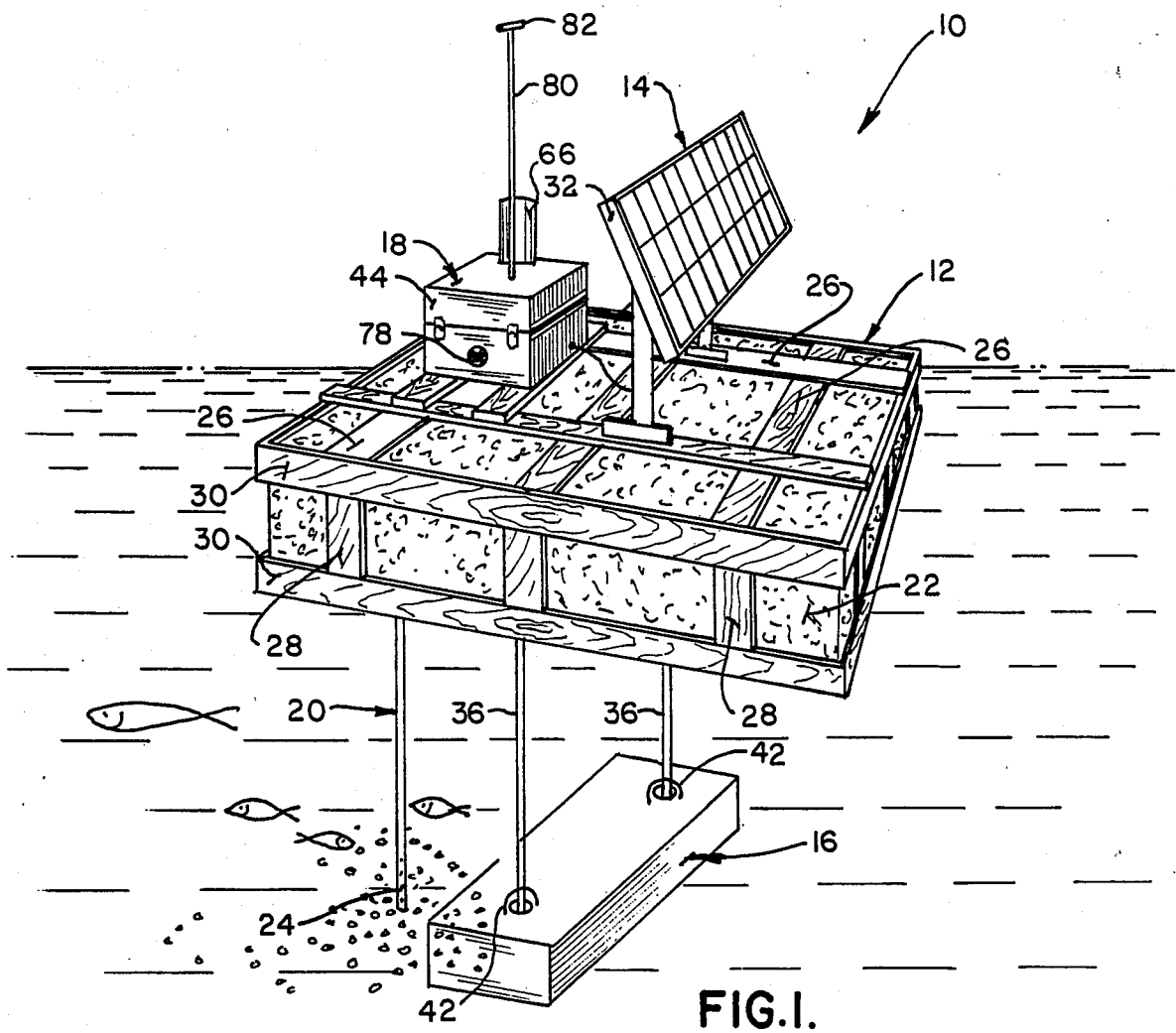
FIG. 1 is a perspective view of the solar activated water aeration station of the present invention and illustrates the manner in which the station provides both shade and dissolved oxygen or fish at a predetermined depth.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

The solar activated water aeration station 10 of the present invention is constructed for introducing dissolved oxygen at a predetermined depth into a body of water. The elements of the solar activated water aeration station 10 includes a floatable base 12 for floating on the body of water, an inclined solar panel 14 which is operatively mounted on the floatable base 12 and is adjusted through a range of inclined positions relative to the floatable base 12, an anchor 16 connected to the floatable base 12 for orienting and maintaining the floatable base in a pre-selected position in order that the solar panel 14 can be maintained in a southern exposure, control means 18 including a motor and air pump which are energized by the solar panel 14 to provide a continuous stream of oxygen during activation of the solar panel 14, and an aeration tube 20 which is connected to the motor and air pump and extends from the floatable base 12 to a predetermined depth in the body of water for delivering the continuous stream of oxygen to the lower end of the aeration tube 20.

The floatable base 12 is preferably constructed from a water resistant foam material 22 having a self-buoyancy or floatation characteristic, such as a suitable closed cell foamed plastic material. The water resistant foam material 22 has a suitable configuration or dimension, on the order to 4' long × 4' wide × 1' thick, or other suitable predetermined square foot area which is sufficient to provide a shaded area within the body of water upon which the floatable base 12 floats. In this same connection, the lower free end 24 of the aeration tube 20 is preferably anchored or suspended at a predetermined depth in the body of water in the vicinity of the shaded area from the floatable base 12 in order to provide what has been termed by the inventor as the "Cox Fish Comfort Station", where marine life may enjoy both shade and dissolved oxygen emanating from the aeration tube 20.

The water resistant foam material 22 is supported within a water resistant wood frame, such as wolmanized treated wood, including spaced horizontal struts 26 extending along top and bottom surfaces of the water resistant foam material 22 and spaced vertical struts 28 extending along the sides thereof which are interconnected to the horizontal struts 26 such as by the upper and lower peripheral side wall struts 30, 30 or other suitable structure for interconnecting the top and bottom horizontal struts 26 with the spaced vertical side struts 28. In lieu of the horizontal and vertical struts 26, 28 forming the wood frame, suitable metal or plastic strut elements formed separate from or integral with respect to the water resistant foam material 22 may be used, if desired.

The solar panel 14 illustrated in the drawings is of the type which utilizes high efficiency, single crystal silicone cells which are laminated to tempered glass with EVA. The laminated package is supported within a metal frame 32 to facilitate the mounting of the solar panel 14. It will be understood that the solar panel 14 generates D.C. electricity when exposed to sunlight.

Figure 2:
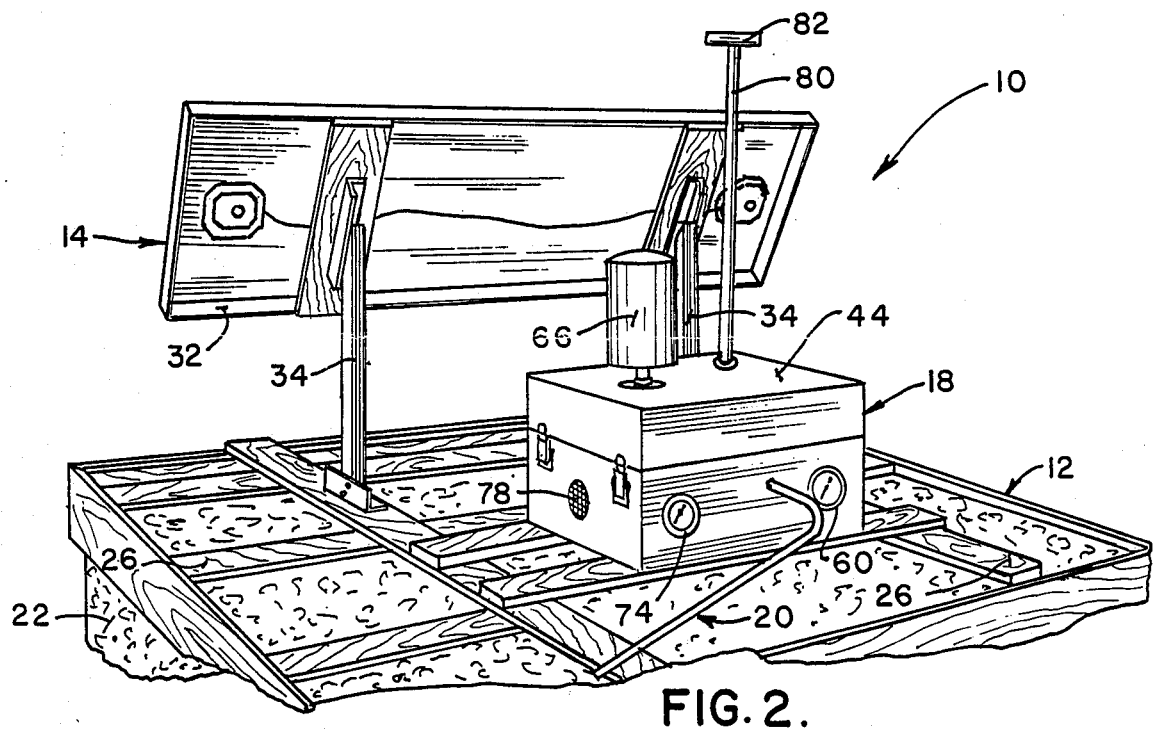
FIG. 2 is a fragmentary rear perspective view illustrating the solar panel and the control means associated with the solar activated water aeration station of the present invention.
Figure 3:
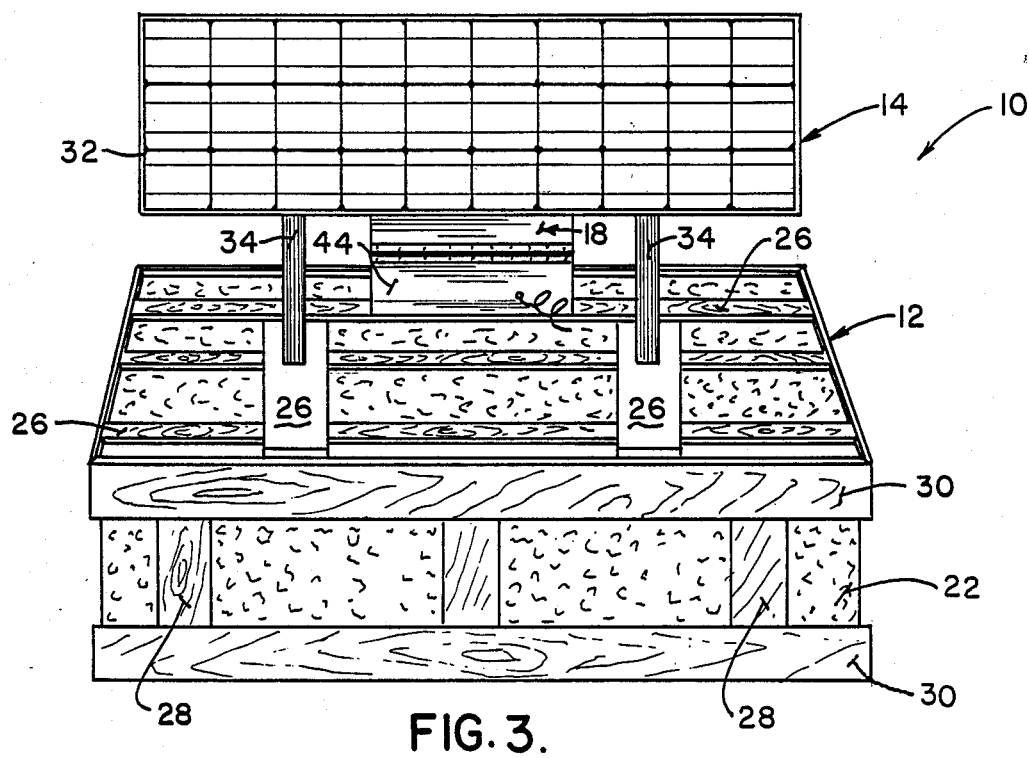
FIG. 3 is a front perspective view of the solar activated water aeration station and illustrating the construction of the floatable base including the mounting of the solar panel thereon.
Figure 4:
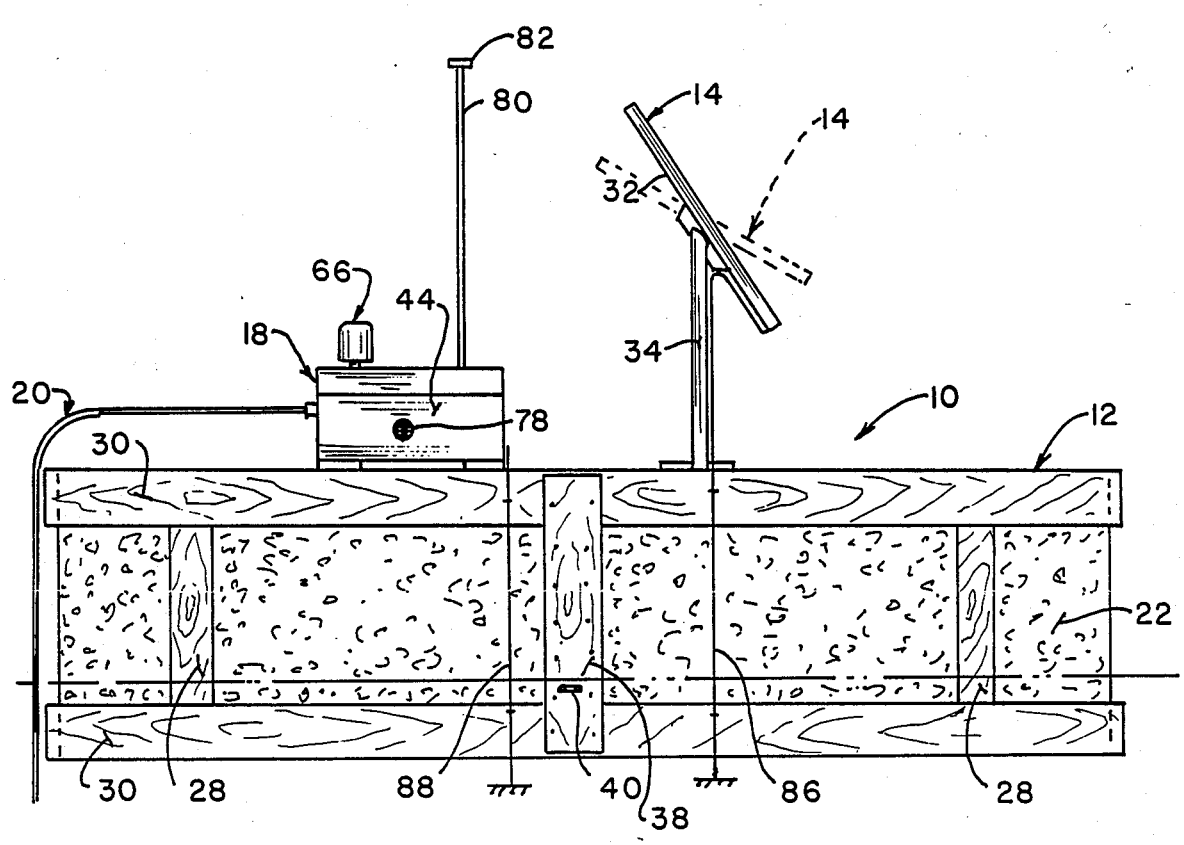
FIG. 4 is a side elevational view of the solar activated water aeration station.

It is to be noted that the solar panel 14 is mounted on upper horizontal struts 26 of the wood frame by vertical aluminum leg supports 34, 34 which are connected to and supported by spaced upper horizontal struts 26 in the wood frame. The vertical leg supports 34, 34, at an upper end thereof, are pivotally adjustably mounted to the metal frame 32 of the solar panel 14, as best seen in FIGS. 2 and 4 of the drawings, for adjusting the solar panel 14 through a range of inclined positions relative to the floatable base 12. The solar panel angle may be adjusted for the particular latitude in which the solar activated water aeration station 10 is used, as determined by a continent solar chart. Preferably, the solar panel 14 is adjusted in a range from 29° through 60°, in order to obtain the maximum sun exposure for a particular latitude. Suitable fastening elements such as wing nuts or the like may be employed to facilitate adjustment of the solar panel 14 to the desired angle, and then fixing the solar panel 14 in the desired position by tightening the wing nuts, for example. Various types of pivot adjusting structure and fastening elements may be employed for this purpose, as will be appreciated.

When the solar panel 14 is inclined at the desired angle for the area latitude in which the station 10 is used, the inclined solar panel 14 will also be self-cleaning. In other words, if dust or dirt accumulate on the face of the solar panel 14, falling rain will wash the exposed face of the solar panel 14, so that accumulated dirt or debris is automatically removed from the inclined solar panel 14. Since it is contemplated that the solar activated water aeration station is constructed to be a self-operating and self-generating system with no requirement for outside energy or on-going maintenance, the self-cleaning solar panel is a desirable feature.

In addition to having the solar panel 14 angularly adjusted for maximum sun exposure, it is important that the solar panel 14 be positioned for exact south or southern exposure. The anchor 16 of the solar activated water aeration station 10 has been constructed for orienting and maintaining the floatable base 12 in a pre-selected position with the solar panel 14 maintaining exact south or southern exposure.

The anchor 16 is preferably a one-piece rectangularly-shaped concrete block that is supported from the floatable base 12 by cables 36, 36 extending from opposite sides of the floatable base 12. As best seen in FIG. 4 of the drawings, the wood frame includes a reinforced frame element 38 having an eye bolt anchor cable support 40 through which each cable 36 extends on opposite sides of the floatable base 12. Note further that the anchor 16 also has eye bolts 42 secured thereto for attachment to the cables. The cables 36, 36 may be shortened or lengthened by any suitable means relative to the floatable base 12 in order to provide the desired depth position of the anchor 16 in the body of water, including resting upon the bottom of a lake, pond or other body of water.

With the anchor 16 orienting and maintaining the solar panel 14 in an exact south or southern exposure, and with the solar panel 14 being angularly adjustable to the desired inclined position, the solar panel 14 will be positioned for maximum sun exposure during daylight hours, thereby serving as a D.C. electric power source for the solar activated water aeration station 10.

In order to convert the direct current electricity generated from the solar panel 14 into a continuous stream of oxygen during activation of the solar panel 14, the control means 18 is provided. Control means 18 includes a self-contained enclosure 44 in which the component parts of the control means 18 are associated.

Figure 5:
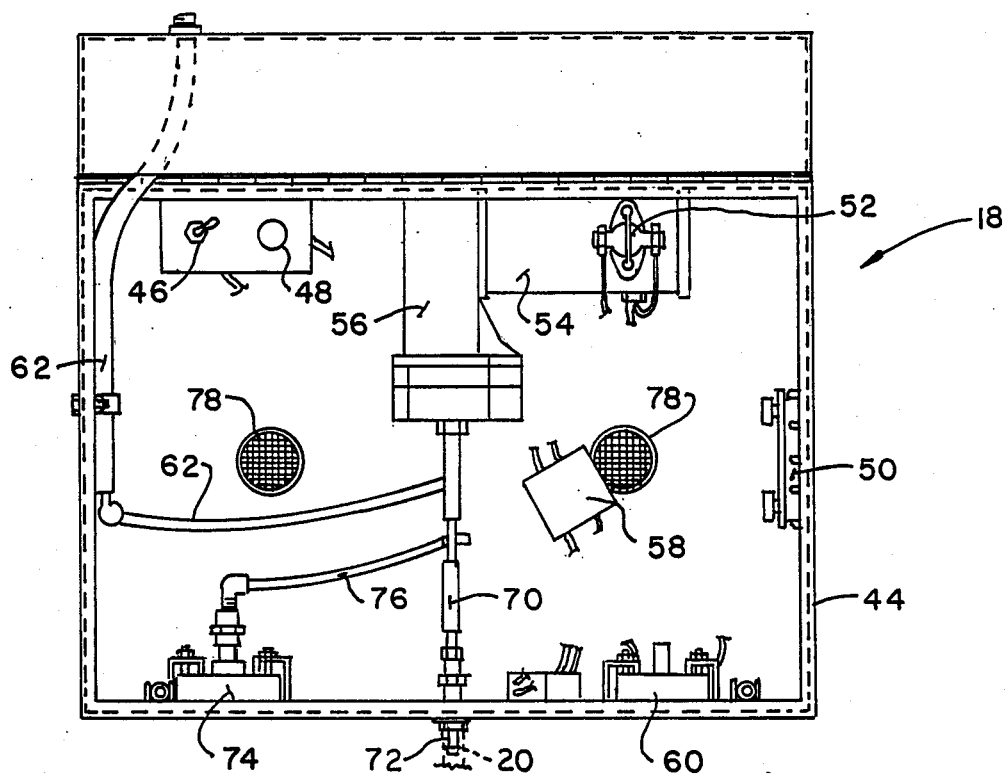
FIG. 5 is a top plan view illustrating the components of the control means mounted within the self-contained enclosure supported by the floatable base.
Figure 6:
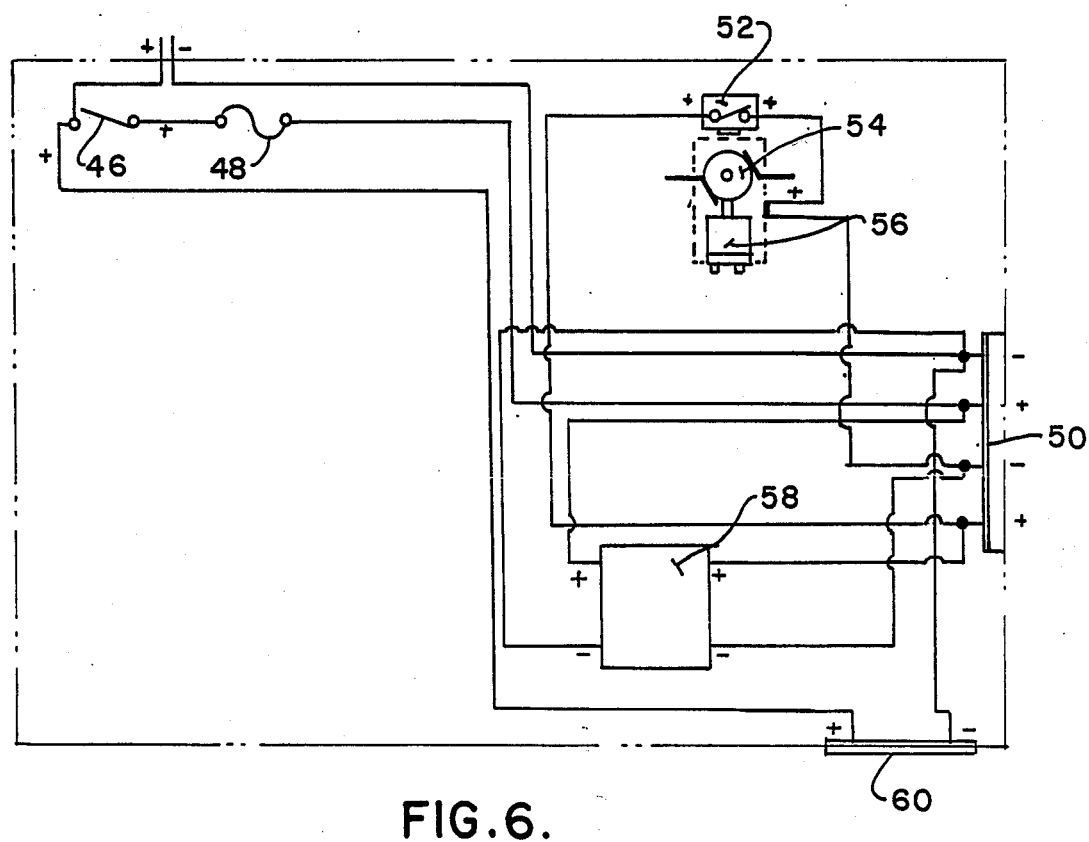
FIG. 6 is an electrical diagram illustrating the leads and wiring connections for the control means.

As best seen in FIGS. 5-6 of the drawings, the electrical components of the control means 18 includes, preferably, a single pole single throw toggle-type switch 46 which may be manually operated by the user to connect or disconnect the electric components of the control means 18 relative to the solar panel 14. Fuse 48 is interconnected in the electrical circuit diagram, as shown in FIG. 6 to prevent damage to the other electrical components in the control means 18 When the single pole single throw toggle-switch 46 is closed, the solar panel 14 is connected through the terminal strip 50 within the self-contained enclosure 44 to thermal switch 52. Thermal switch 52 interrupts the electrical circuit when heat within the self-contained enclosure 44 exceeds a predetermined temperature. If the predetermined temperature is not exceeded, the thermal switch 52 is not opened, thereby allowing the electrical circuit to be completed through the combined D.C. motor 54 and air pump 56.

Also electrically connected between the solar panel 14 and the motor and air pump 54, 56 is a linear control booster 58 which serves to both control and boost the output from the solar panel 14. The linear control booster 58 may be of the type manufactured by Bobler Electronics, Inc. of Parkersburg, West Virginia and designated as "LCB TM" linear control booster. When a predetermined voltage and amperage is reached, the linear control booster 58 is then activated to allow predetermined voltage and amperage to be electrically interconnected to the motor and air pump 54, 56. In order to measure the amount of voltage generated by the solar panel 14, a volt meter 60 may be provided on the enclosure 44 for visual observation by the user of the station 10.

The motor and air pump 54, 56 are of the oil-less continuous operating type and are constructed of corrosion resistant material so as to provide maintenance free usage. An example of such a motor and air pump is manufactured by K.N.F. Neuberger, Inc. of Princeton, New Jersey. The motor and air pump 54, 56 is designed to operate within a preferred temperature range, for example 40°–105°, and therefore, the thermal switch 52 will be activated when the higher temperature range is reached so as to prevent damage to the motor and air pump 54, 56.

When the motor and air pump 54, 56 are operating, continuous stream of oxygen emanates from the air pump 56 to the aeration tube 20 for delivering dissolved oxygen to a predetermined depth in the body of water.

Figure 7:
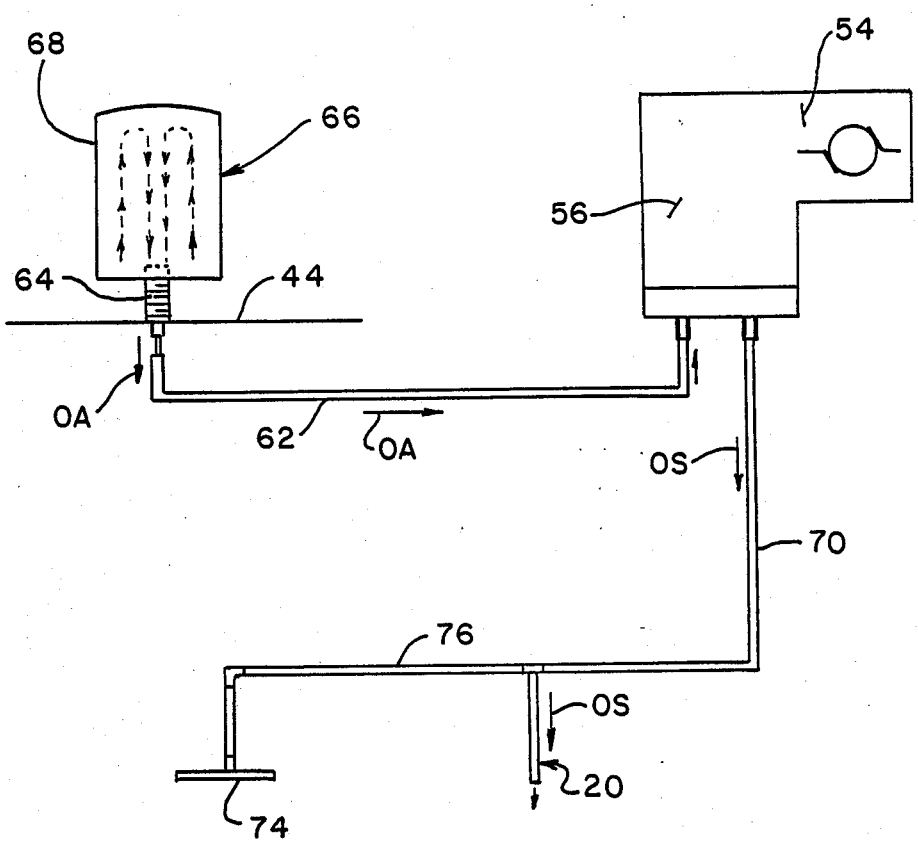
FIG. 7 is a diagrammatic representation illustrating the air flow path from the outside air filter into the motor and air pump contained within the enclosure, and then into the aeration tube for delivering dissolved oxygen to the body of water at the predetermined depth desired Corresponding reference numerals will be used throughout the various figures in the drawings.

In order to understand the operation of the air flow into and out of the control means 18, reference is made particularly to FIG. 2, 5 and 7 of the drawings. The combined motor and air pump 56, 58 draw outside air through the outside air line 62, as shown in FIG. 7 of the drawings, which is connected at one end to the combined motor and air pump 54, 56 and at the other end to a threaded hollow element 64 which is fixed relative to the self-contained enclosure 44. An externally mounted filter 66 is threadably associated relative to the threaded hollow element 64 to filter outside air drawn into the motor and air pump 54, 56 through the outside air line 62. Preferably, the filter 66 is of the common type used in automobiles to facilitate ready availability and replacement. Furthermore, such automobile oil filters include an overhanging protective shroud 68 which prevents water from entering the air filter 66 during turbulent water movement when raining. The overhanging protective shroud 68 further protects the filter air passageways illustrated diagrammatically by the arrows in FIG. 7 of the drawings as extending from the bottom of the air filter, then upwardly into the filter, and finally down through the threaded hollow element 64 into the outside air line 62. As will be appreciated, the air passageways in the air filter 66 further serve to prevent water from entering the outside air line 62 which could substantially limit the operation of the motor and air pump 54, 56 due to possible corrosive effect on such components. Although a common automobile oil filter is preferably used for the air filter 66, it will be appreciated that the manner in which such filter 66 is used in connection with the threaded hollow element 64 in the self-contained enclosure 44 provides a different and structurally unique use of a common automobile oil filter in a solar activated water aeration station 10.

Converting the outside air flow into a continuous stream of dissolved oxygen during operation of the solar panel 14 is best illustrated by the air flow diagrammatic view of FIG. 7. There, it will be seen that the arrows OA illustrate the manner in which the combined motor and air pump 54, 56 draw outside air OA through the outside air line 62, after having been filtered through the air filter 66 as described above. The combined motor and air pump 54, 56 draw the outside air OA through the air line 62 then delivers the continuous stream of oxygen to the line 70, connected between the combined motor and air pump 54, 56 and the self-contained enclosure 44, as best seen in FIG. 5 of the drawing. A nipple or tube fitting 72 is mounted to the self-contained enclosure 44, in communication with the air line 70, to enable the aeration tube 20 to be connected to thereto. When the solar panel 14 activates the motor and air pump 54, 56 a continuous stream of oxygen, represented by arrows OS, will be delivered through the air line 70 and into the aeration tube 20 for delivery to a predetermined depth in the body of water as dissolved oxygen.

In order to determine whether or not there is any back air pressure from the diffuser which could inhibit the operation of the combined motor and air pump 54, 56, a back pressure p.s.i. gauge 74 is mounted to the self-contained enclosure 44 for visual reading thereof by a user. The back pressure p.s.i. oxygen gauge is connected directly to the air line 70 via the line 76, as shown in FIGS. 5 and 7 of the drawing.

In order to vent heated air and any moisture from the self-contained enclosure 44, a series of screen vents 78 are provided in the bottom and side walls of the self-contained enclosure 44 to allow air or moisture to escape therefrom. In addition, an elongated copper tube 80 in the form of a chimney can be removably mounted relative to the top of self-contained enclosure 44 for exhausting heated air from within the enclosure to atmosphere. The upper end of the tube is an interconnected small transverse tube section 82 which also prevents water from directly entering the chimney 80. As will be appreciated, the combined motor and air pump 54, 56 may preferably be operated within a temperature range of 40°–105°, exhausting heated air from within the enclosure by way of the screen vents 78 and the chimney 80 facilitates removal of heated air and allow the combined motor and air pump 54, 56 to operate within the desired temperature.

As shown in FIG. 4 of the drawings, ground wires 86, 88 extend from the solar panel 14 and self-contained enclosure 44 across the floatable base 12 and into the body of water for grounding the electrical components so they may operate at maximum efficiency, without outside interference.

In order to provide diffusion of the oxygen stream OS at the lower end 24 of the aeration tube 20, to assure water absorption of the dissolved oxygen, a variety of different diffusion elements may be associated with the lower end 24 of the aeration tube 20. For example, the dissolved oxygen can be broken up into smaller molecules by pumping the dissolved oxygen through substances like sponges, Florida silk sponge, for example. The porosity and natural construction of Florida silk sponge, combined with a low resistance to pressure, makes it a good diffuser. Other types of low density foams can be used, as well as various sandstones and diffuser tubes which are commercially manufactured.

Optimum level of oxygen in a body of water is considered to be 4-9 parts per million. By selecting an appropriate solar panel, combined motor and air pump and other components, I have produced a working solar activated water aeration station 10 which produces on the order of at least ⅓ cubic foot per minute of dissolved oxygen for delivery through the lower end 24 of the aeration tube 20. This quantity of dissolved oxygen, dispersed into the body of water at a predetermined depth, provides the aforementioned optimum level of oxygen in the vicinity of the solar activated water aeration station.

It is well known from catfish producers that their number one problem is low oxygen in catfish breeding ponds. Fish do not feed well at low oxygen concentration and low oxygen content restricts the fish carrying capacity or content of the production ponds. In addition to "fish farmers", there are many lakes, ponds and other bodies of water which could be substantially enhanced by what I call the "Cox Fish Comfort Station", not only from the standpoint of allowing marine life to survive and breed, but also from the standpoint of encouraging a healthy environment for the overall well-being of the lake, pond or other body of water. The present invention serves to enhance the marine and plant life environment, as well as maintain the desired quality of the water for all fish species.

From the foregoing, it will be appreciated that the solar activated water aeration station 10, which has been termed as the "Cox Fish Comfort Station", restores or maintains optimum levels of oxygen at a predetermined depth in the vicinity of the station by injecting dissolved and diffused oxygen at such predetermined depths. By combining shade with the availability of oxygen, it will be apparent that a true fish comfort zone will be provided in the vicinity of the solar activated water aeration station 10.

In view of the above, it will be seen that the several objects and features of this invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A solar activated water aeration station for introducing dissolved oxygen at a predetermined depth into a body of water, comprising:

a floatable base for floating on a body of water;

an inclined and adjustable solar panel operatively mounted on said base to enable said solar panel to be adjusted through a range of inclined positions relative to said floatable base;

an anchor connected to said floatable base for orienting and maintaining said floatable base in a preselected position with the solar panel maintaining a southern exposure;

control means mounted on said floatable base and operated by said solar panel for energizing a floatable base mounted motor and air pump in order to provide a continuous stream of oxygen during activation of said solar panel, said control means including means for controlling and boosting the output from the solar panel for operating said floatable base mounted motor and air pump with maximum power output and operation efficiency;

an aeration tube connected to said motor and air pump and extending from said floatable base to a predetermined depth in the body of water for delivering the continuous flow of oxygen to the body of water at the aforesaid predetermined depth through a lower free end of said aeration tube; and diffuser means cooperating with the lower free end of the aeration tube for breaking up the continuous stream of oxygen into smaller molecules and thereby facilitating mixing of the oxygen into the body of water as dissolved oxygen at the aforesaid predetermined depth.

2. The station as defined in claim 1 wherein said floatable base is constructed from water resistant foam material supported within a water resistant wood frame.

3. The station as defined in claim 2 wherein said wood frame includes spaced horizontal struts extending along top and bottom surfaces of said floatable base and spaced vertical struts extending along sides of said floatable base and being interconnected to said horizontal struts.

4. The station as defined in claim 1 wherein said floatable base is totally enclosed and provides a predetermined square foot enclosed shaded area within the body of water corresponding to said floatable base, and the open free end of said aeration tube being anchored at a predetermined depth in the body of water in the vicinity of the shaded area in order to provide a fish comfort station including both shade and oxygen.

5. The station as defined in claim 3 wherein said inclined solar panel is mounted on upper horizontal struts of said wood frame.

6. The station as defined in claim 5 wherein said solar panel is adjustably mounted on spaced vertical leg supports connected to spaced upper horizontal struts on said wood frame, each of said vertical leg supports at an upper end thereof being pivotally adjustably mounted to said solar panel.

7. The station as defined in claim 1 wherein said anchor is connected to cables extending from opposite sides of said floatable base, said cables being shortened or lengthened relative to said floatable base to provide the desired depth position of said anchor.

8. The station as defined in claim 7 wherein said anchor is of one-piece concrete construction with a rectangular configuration and having eye bolts secured therein for attachment to said cables.

9. The station as defined in claim 1 wherein said control means including said motor and air pump are mounted within a self-contained enclosure mounted on said floatable base.

10. The station as defined in claim 9 wherein ground wires extend from said solar panel and said enclosure across said floatable base and into the body of water for grounding purposes.

11. The station as defined in claim 9 wherein said means for controlling and boosting the output from the solar panel comprises linear control booster means connected between the solar panel and said motor and air pump for controlling and boosting the output from the solar panel.

12. The station as defined in claim 11 wherein said motor and air pump are of the oil-less continuous operating type constructed of corrosion resistant material.

13. The station as defined in claim 12 wherein said motor and air pump comprise a combined D.C. motor and air pump.

14. The station as defined in claim 13 wherein said air pump draws outside air therein through an outside air line connected to an air filter externally mounted on said enclosure.

15. The station as defined in claim 14 wherein said air filter comprises an automobile oil filter which is releasably connected to a hollow element extending through said enclosure, said outside air line being connected to said hollow element within said enclosure.

16. The station as defined in claim 15 wherein said automobile oil filter includes an overhanging protective shroud and air passageways extending from the bottom of the filter upwardly into the filter and then downwardly through said hollow element in said enclosure.

17. The station as defined in claim 9 wherein said enclosure further includes a chimney extending from said enclosure for exhausting heated air from within said enclosure to atmosphere, said chimney including a transverse portion at an outer free end thereof which prevents water from entering the chimney.

18. The station as defined in claim 17 wherein said enclosure includes a back pressure PSI oxygen gauge to determine the operation of the diffuser means and a volt meter to determine the amount of voltage generated by the solar panel.

19. The station as defined in claim 18 wherein said diffuser means comprises a low air density and porous product for breaking up the stream of oxygen into smaller molecules and thereby facilitate mixing of the oxygen into the body of water at the predetermined depth.

20. A solar activated water aeration station for introducing oxygen at a predetermined depth into a body of water including a solar panel mounted on a floatable base for operating control means including a motor and air pump mounted on the floatable base and connected to an aeration tube which delivers oxygen from the motor and air pump to a predetermined depth in a body of water on which the floatable base is floating, said station further comprising an externally mounted air filter releasably connected to a self-contained enclosure to facilitate replacement thereof and communicating with the enclosure by way of an outside air flow line at one end, the outside air flow line being connected at an opposite end to the motor and air pump, and chimney means extending from said enclosure for exhausting heated air from said enclosure to atmosphere.

21. The station as defined in claim 20 wherein said air filter is threadably connected to a hollow element extending through said enclosure, and said outside air line being connected to said hollow element within said enclosure.

22. The station as defined in claim 21 wherein said air filter includes an overhanging protective shroud and air passageways extending from the bottom of the filter upwardly into the filter and then downwardly through said hollow element in said enclosure.

23. The station as defined in claim 22 wherein said chimney means includes a chimney extending from said enclosure for exhausting heated air from said enclosure to atmosphere, said chimney having a transverse portion at an upper free end thereof which prevents water from entering the chimney.

24. A solar activated water aeration station for introducing oxygen at a predetermined depth into a body of water including a solar panel mounted on a floatable base for operating control means including a motor and air pump mounted on the floatable base and connected to an aeration tube which delivers oxygen from the motor and air pump to a predetermined depth in a body of water on which the floatable base is floating, said station further comprising solar panel positioning means including floatable base anchor means depending from the floatable base for maintaining the solar panel in a pre-selected position with a southern exposure, and adjustable inclination means extending upwardly from the floatable base for adjusting the solar panel throughout a range of inclined positions relative to the floatable base for pre-selected area latitude, thereby providing maximum sun exposure.

25. The station as defined in claim 24 wherein said anchor means includes a one-piece concrete anchor adjustably mounted to said floatable base by cables extending from opposite sides of said floatable base.

26. The station as defined in claim 24 wherein said adjustable inclination means includes vertical legs supported by said floatable base and has pivotal adjustments at the upper end thereof.

27. A solar activated water aeration station for introducing oxygen at a predetermined depth into a body of water including a solar panel mounted on a floatable base for operating control means including a motor and air pump mounted within a self-contained enclosure on the floatable base and connected to an aeration tube which delivers oxygen from the motor and air pump to a predetermined depth in a body of water on which the floatable base is floating, said station further comprising a linear control booster connected between the solar panel and motor and air pump for controlling and boosting the output from the solar panel which operates in cooperation with the motor and air pump which are of the oil-less continuous operating type, in order to maximize power output and operation efficiency.

28. The station as defined in claim 27 wherein the motor and air pump comprise a combined D.C. motor and air pump.

29. The station as defined in claim 28 wherein said enclosure includes a back pressure PSI oxygen gauge to determine efficient operation of a diffuser means cooperating with the lower free end of the aeration tube, and a volt meter to determine the amount of voltage generated by the solar panel.

30. The station as defined in claim 29 and including outside air filter means releasably connected to a hollow element extending through said enclosure to filter outside air to the motor and air pump and chimney means extending from said enclosure for exhausting heated air from within said enclosure.

* * * * *